(12) United States Patent
Tomescu et al.

(10) Patent No.: US 11,480,585 B2
(45) Date of Patent: Oct. 25, 2022

(54) HYBRID FEEDBACK DEVICE

(71) Applicant: PRATT & WHITNEY CANADA CORP., Longueuil (CA)

(72) Inventors: Dana Tomescu, Brampton (CA); Nick Stina, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 62 days.

(21) Appl. No.: 17/083,551

(22) Filed: Oct. 29, 2020

(65) Prior Publication Data

US 2021/0325419 A1  Oct. 21, 2021

Related U.S. Application Data

(60) Provisional application No. 63/011,420, filed on Apr. 17, 2020.

(51) Int. Cl.
*G01P 3/481* (2006.01)
*B64D 27/10* (2006.01)

(52) U.S. Cl.
CPC ............. *G01P 3/481* (2013.01); *B64D 27/10* (2013.01)

(58) Field of Classification Search
CPC .......... G01P 3/481; G01P 3/488; B64D 27/10
See application file for complete search history.

(56) References Cited

U.S. PATENT DOCUMENTS

| 4,002,937 A | 1/1977 | Anson |
| 6,564,635 B2 | 5/2003 | Sherman et al. |
| 6,940,276 B2 | 9/2005 | Shafiyan-Rad et al. |
| 7,285,949 B2 | 10/2007 | Burns et al. |
| 2005/0103902 A1* | 5/2005 | Hornsell ............. F16K 31/0655 239/585.1 |
| 2006/0098060 A1* | 5/2006 | Horsnell ............. F16K 31/0679 347/85 |
| 2006/0238587 A1* | 10/2006 | Horsnell ................ B41J 3/4078 347/100 |

(Continued)

FOREIGN PATENT DOCUMENTS

| DE | 102009053916 | 5/2011 |
| FR | 2590989 | 6/1987 |

*Primary Examiner* — Alvaro E Fortich
*Assistant Examiner* — Zannatul Ferdous
(74) *Attorney, Agent, or Firm* — Norton Rose Fulbright Canada LLP (57) ABSTRACT

A feedback device is coupled to rotate with a rotating component of an aircraft engine. The feedback device comprises a body having cavities defined therein and circumferentially spaced thereabout, each cavity configured to receive therein a position marker, the body made of a non-ferromagnetic material and the position markers comprising a ferromagnetic material. A sealing member is configured to be secured to the body for retaining the position markers within the cavities. At least one sensor is positioned adjacent the feedback device and configured for producing, as the feedback device rotates about a longitudinal axis with the rotating component, at least one sensor signal in response to detecting passage of the position markers. A processing unit is communicatively coupled to the at least one sensor and configured to determine a rotational speed of the rotating component from the at least one sensor signal received from the at least one sensor.

18 Claims, 11 Drawing Sheets

(56) References Cited

U.S. PATENT DOCUMENTS

| | | | |
|---|---|---|---|
| 2008/0074100 A1 | 3/2008 | Burns et al. | |
| 2013/0201755 A1* | 8/2013 | Ezaki | H01L 27/228 |
| | | | 365/158 |
| 2016/0290831 A1 | 10/2016 | Ohr et al. | |
| 2018/0228628 A1* | 8/2018 | Kusleika | A61F 2/91 |
| 2018/0246136 A1 | 8/2018 | Boldt et al. | |
| 2019/0016246 A1* | 1/2019 | Maiorana | B60P 3/2205 |
| 2019/0275789 A1* | 9/2019 | Matsushita | B41J 2/025 |
| 2020/0017234 A1* | 1/2020 | Marone | B64C 11/06 |
| 2021/0070424 A1 | 3/2021 | Tomescu et al. | |

* cited by examiner

HYBRID FEEDBACK DEVICE

CROSS REFERENCE TO RELATED APPLICATIONS

This patent application claims priority of U.S. provisional Application Ser. No. 63/011,420, filed on Apr. 17, 2020, the entire contents of which are hereby incorporated by reference.

TECHNICAL FIELD

The application relates generally to engines, and more specifically to feedback systems for engines.

BACKGROUND OF THE ART

Engine speed is typically measured via dedicated speed sensors. However, existing engine sensing systems sometimes require additional features, such as dedicated readable markers, for the sole purpose of speed sensing. This can however increase the weight and size of the overall system by increasing axial space, which leads to an increase in the overall length of the engine. In addition, existing speed measurement systems are often complex and expensive.

Therefore, improvements are needed.

SUMMARY

In one aspect, there is provided a feedback system for a rotating component of an aircraft engine, the rotating component rotatable about a longitudinal axis. The system comprises a feedback device coupled to rotate with the rotating component, the feedback device comprising a body having a plurality of cavities defined therein and circumferentially spaced thereabout, each of the plurality of cavities configured to receive therein one of a plurality of position markers, the body made of a non-ferromagnetic material and the plurality of position markers comprising a ferromagnetic material, and a sealing member configured to be secured to the body for retaining the plurality of position markers within the plurality of cavities. The system also comprises at least one sensor positioned adjacent the feedback device and configured for producing, as the feedback device rotates about the longitudinal axis, at least one sensor signal in response to detecting passage of the plurality of position markers, and a processing unit communicatively coupled to the at least one sensor and configured to determine a rotational speed of the rotating component from the at least one sensor signal received from the at least one sensor.

In another aspect, there is provided a feedback device for an aircraft engine, the feedback device comprising a body having a plurality of cavities defined therein and circumferentially space thereabout, each of the plurality of cavities configured to receive therein one of a plurality of position markers, the body made of a non-ferromagnetic material and the plurality of position markers comprising a ferromagnetic material, and a sealing member configured to be secured to the body for retaining the plurality of position markers within the plurality of cavities.

In a further aspect, there is provided a feedback method for a rotating component of an aircraft engine, the rotating component rotatable about a longitudinal axis, the method comprising, at a processing device, receiving at least one sensor signal from at least one sensor positioned adjacent a feedback device coupled to rotate with the rotating component, the feedback device comprising a body having a plurality of cavities defined therein and circumferentially space thereabout, each of the plurality of cavities configured to receive therein one of a plurality of position markers, the body made of a non-ferromagnetic material and the plurality of position markers comprising a ferromagnetic material, and a sealing member configured to be secured to the body for retaining the plurality of position markers within the plurality of cavities, the at least one sensor signal produced by the at least one sensor in response to detecting passage of the plurality of position markers as the feedback device rotates about the longitudinal axis, and determining a rotational speed of the rotating component from the at least one sensor signal.

DESCRIPTION OF THE DRAWINGS

Reference is now made to the accompanying figures in which.

DETAILED DESCRIPTION

Figure 1:
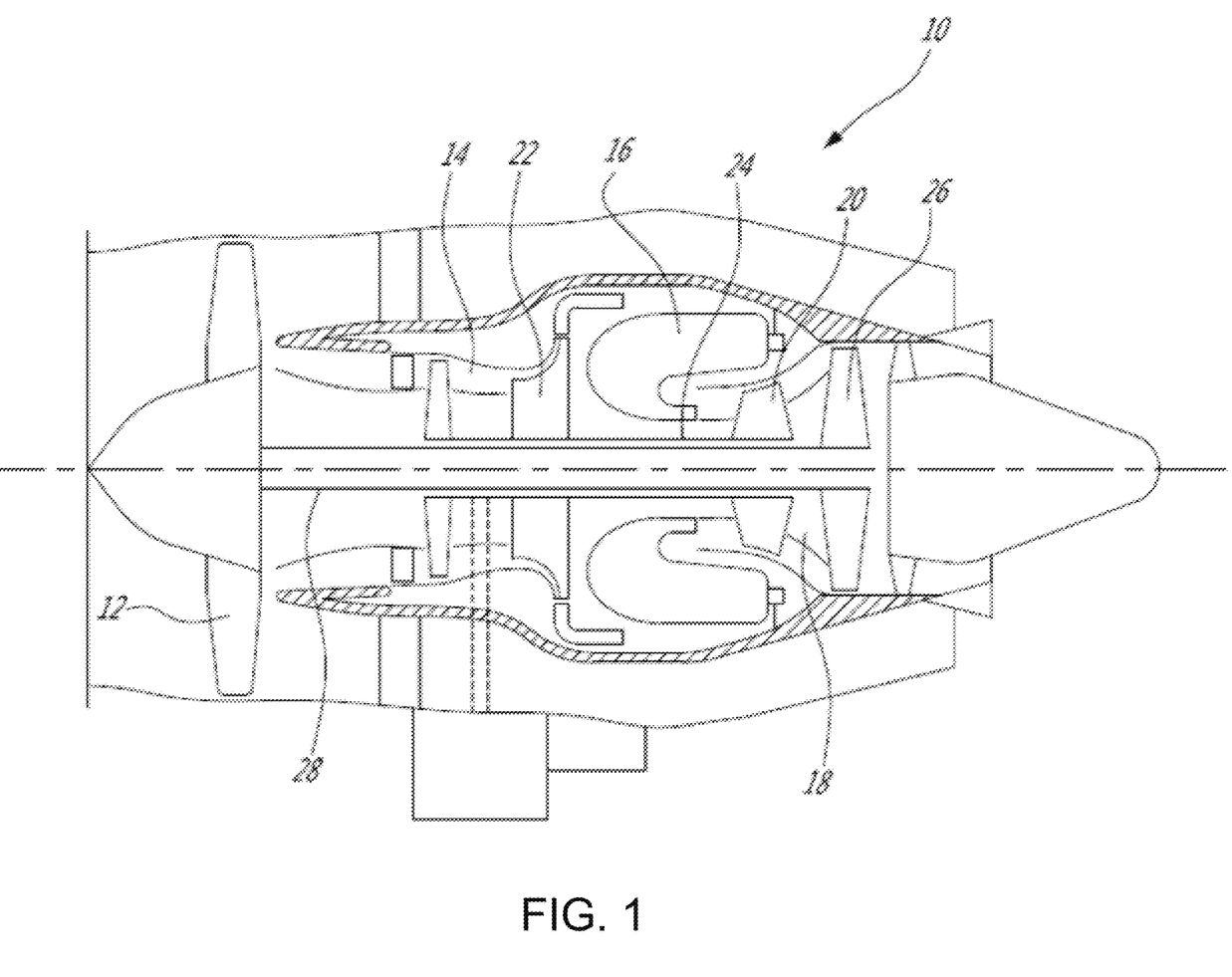
FIG. 1 is a schematic cross-sectional view of an example gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. The engine 10 may be for flight applications, industrial applications, or the like.

Figure 2:
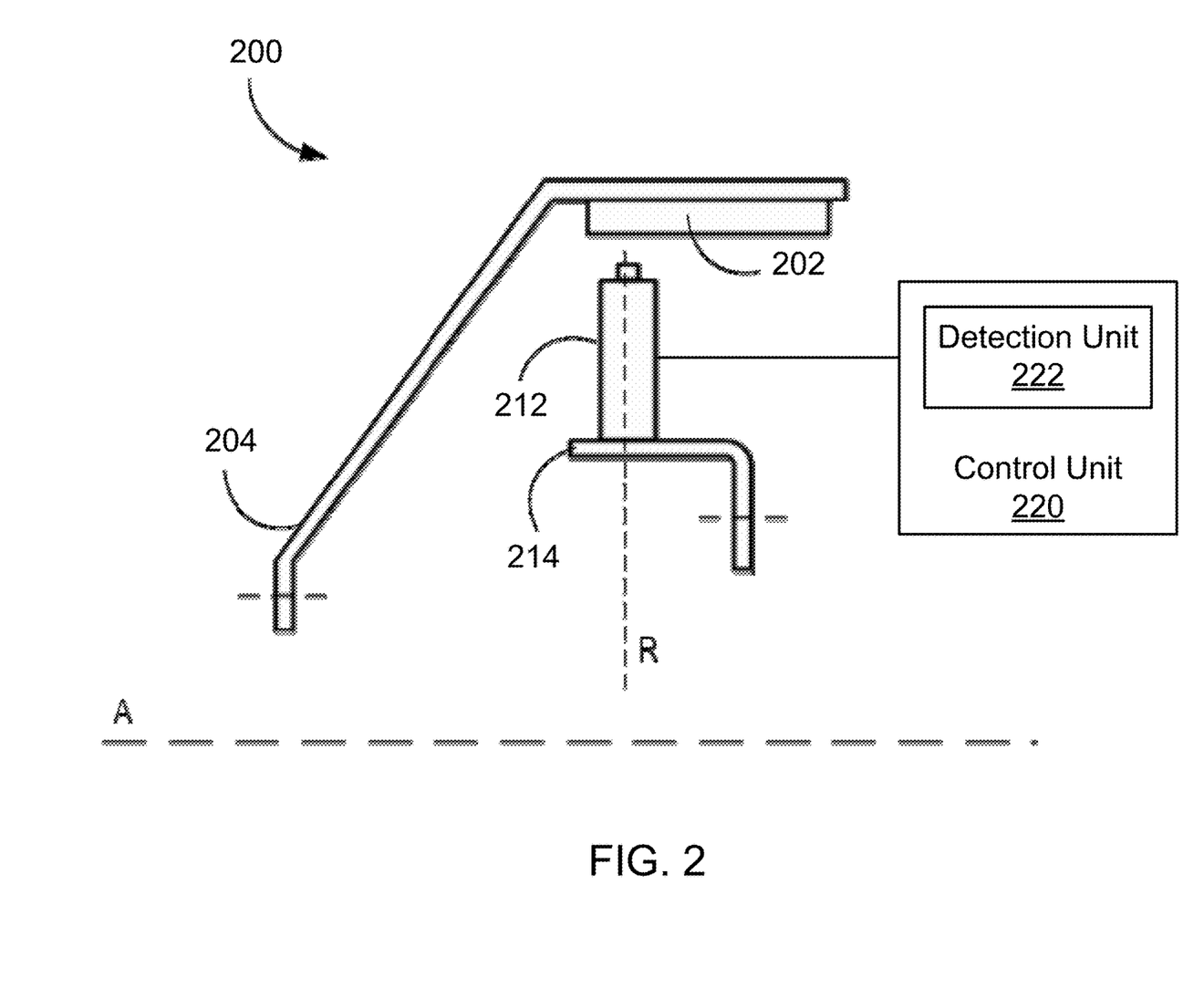
FIG. 2 is a schematic diagram of an example feedback system, in accordance with one embodiment.

Referring to FIG. 2, there is illustrated an example feedback system 200 for speed sensing. The system 200 provides for detection and measurement of rotational speed of one or more rotating components of an engine, such as the engine 10. It should be noted that although the present disclosure focuses on the use of the system 200 in gas turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric). Auxiliary Power Units (APUs) may also apply.

In some embodiments, the system 200 may be used to determine the rotational speed of the high pressure shaft 24 or the low pressure shaft 28 of engine 10. In yet other embodiments, the system 200 may be used to determine the rotational speed of an aircraft propeller, for example of a turboprop engine. Other embodiments may also apply.

The system 200 comprises a feedback device (also referred to herein as a 'phonic wheel' or 'phonic ring') 204 and one or more sensors 212 positioned proximate the feedback device 204. As will be discussed further below, the feedback device 204 (also referred to herein as a 'hybrid feedback device') is composed of an annular member having a plurality of circumferentially-spaced apart and detectable position markers 202 embedded therein for detection by sensor(s) 212. In some embodiments, the position markers 202 and sensor(s) 212 may be disposed on a radially-outer side of feedback device 204. Alternatively, the position markers 202 and sensor(s) 212 may be disposed on a radially-inner side of feedback device 204. Several position markers 202 may be spaced about the circumference (i.e., the perimeter) of the feedback device 204 at a known distance. In addition, the feedback device 204 can include any suitable number of position markers 202, which can vary based on the dimensions of the feedback device 204. In some embodiments, the position markers 202 are equally distributed (i.e. equally spaced) across the feedback device 204. In one embodiment, the position markers 202 are of substantially a common shape and size, for example having a common volumetric size. Still, other embodiments are considered.

In one embodiment, the one or more sensors 212 are fixedly mounted to a static portion of the engine 10. In other embodiments, the one or more sensors 212 are mounted for rotation with the rotating component and the feedback device 204 (or position markers 202) is fixedly mounted to a static portion of the engine 10.

The system 200 also includes a control unit 220 communicatively coupled to the one or more sensors 212. The sensor(s) 212 are configured for producing one or more sensor signals which are transmitted to or otherwise received by the control unit 220, for example via a detection unit 222 thereof. In particular, the one or more sensor signals received at the detection unit 222, whereby any known or other speed detection circuit and/or algorithm may be applied in order to obtain the rotational speed at the output of the detection unit 222. In one embodiment, the control unit 220 generates, based on the sensor signal(s), a feedback signal indicative of the rotational speed. The sensor signal can be an electrical signal, digital or analog, DC or AC, or any other suitable type of signal. The sensor signal may be another type of electromagnetic signal. The sensor(s) 212 may produce a signal pulse in response to detecting the presence of a position marker 202 in a sensing zone of the sensor 212.

In some embodiments, the sensor 212 is an inductive sensor that operates on detecting changes in magnetic flux, and has a sensing zone which encompasses a circular or rectangular area or volume in front of the sensor 212. When a position marker 202 is present in the sensing zone, or passes through the zone during rotation of the feedback device 204, the magnetic flux generated by the sensor(s) 212 in the sensing zone is varied by the presence of the position marker 202, and the sensor 212 can produce a signal pulse, which forms part of the sensor signal. Accordingly, the position markers 202 may be made of any suitable material (e.g., a ferromagnetic material, Mu-Metal, or the like, as will be discussed further below) which would cause the passage of the position markers 202 near the sensor 212 to provide a change in magnetic permeability within the magnetic field generated by the sensor 212. Other embodiments may also apply. In some embodiments, the sensor 212 is a variable reluctance speed sensor, and the amplitude of the sensor signal is a function of the geometry of the position markers 202, magnetic properties of the position markers 202, electrical load, rotational speed, and an air gap between the sensor 212 and the position marker 202.

With continued reference to FIG. 2, a side view of a portion of a feedback device 204 and sensor 212 in accordance with at least some embodiments is shown. The sensor 212 is mounted to a flange 214 of a housing (for example of a reduction gearbox or engine bearing housing), so as to be positioned adjacent the plurality of position markers 202, which are embedded in the feedback device 204 and detectable by the sensor 212. The sensor 212 may be mounted at any suitable angle relative to the position markers 202, including perpendicularly thereto. In some embodiments, the sensor 212 is secured to the rotating component so as to extend away from the flange 214 and towards the position markers 202 along a radial direction, identified in FIG. 2 as direction 'R'. Sensor 212 and flange 214 may be fixedly mounted, for example to the housing of a reduction gearbox, to the engine bearing housing or to any other static element of the engine 10, as appropriate.

In some embodiments, a single sensor 212 is mounted in close proximity to the feedback device 204 and the position markers 202. In some other embodiments, in order to provide redundancy as well as multiple signal sources at different radial locations, one or more additional sensors, which may be similar to the sensor 212, are provided. It should be understood that any suitable number of sensors 212 may apply and the number of sensors 212 and their positions may be optimized according to the specifics of the application.

Figure 3A:
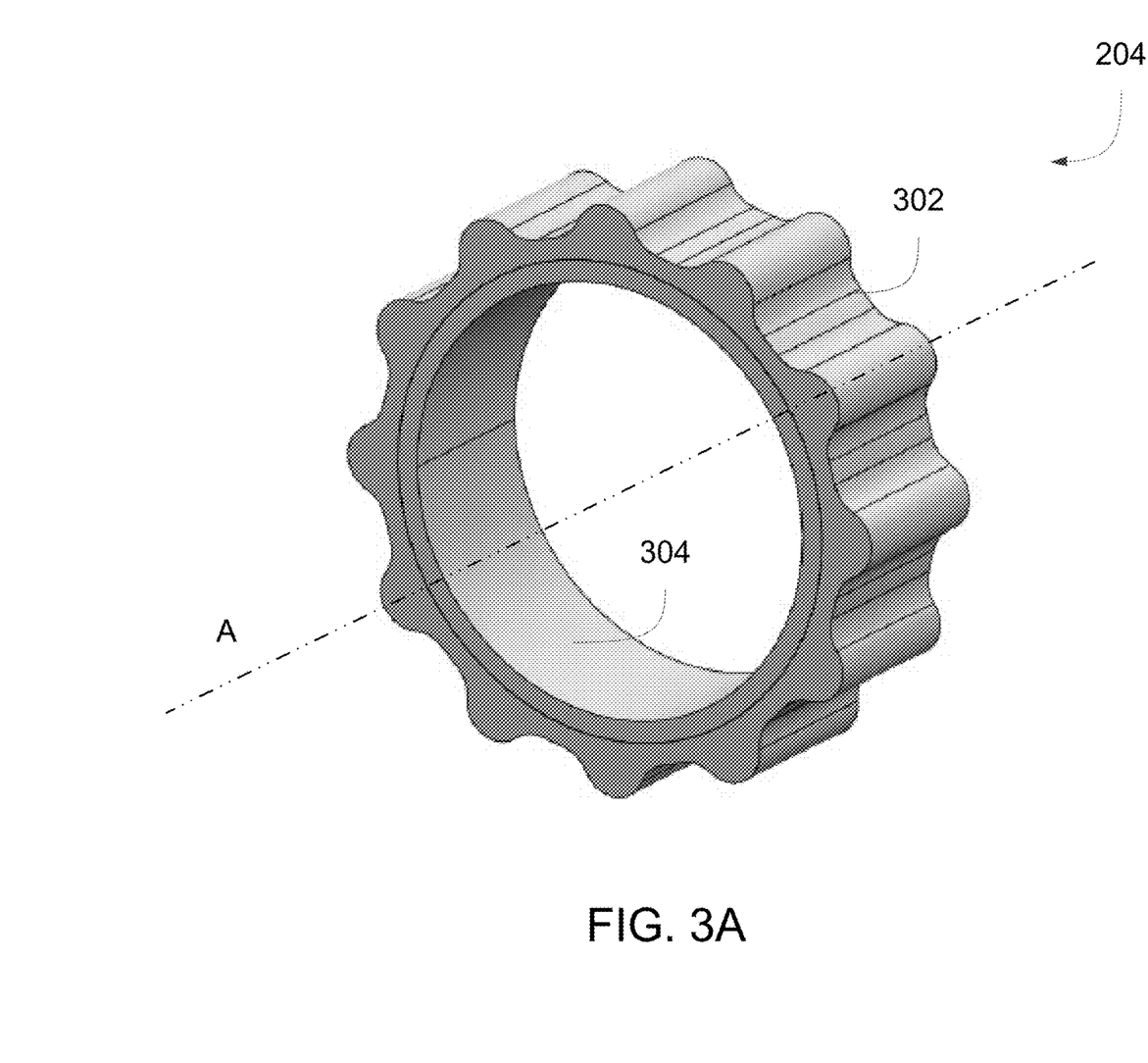
FIG. 3A is a schematic diagram of the feedback device of FIG. 2, in accordance with one embodiment.
Figure 3B:
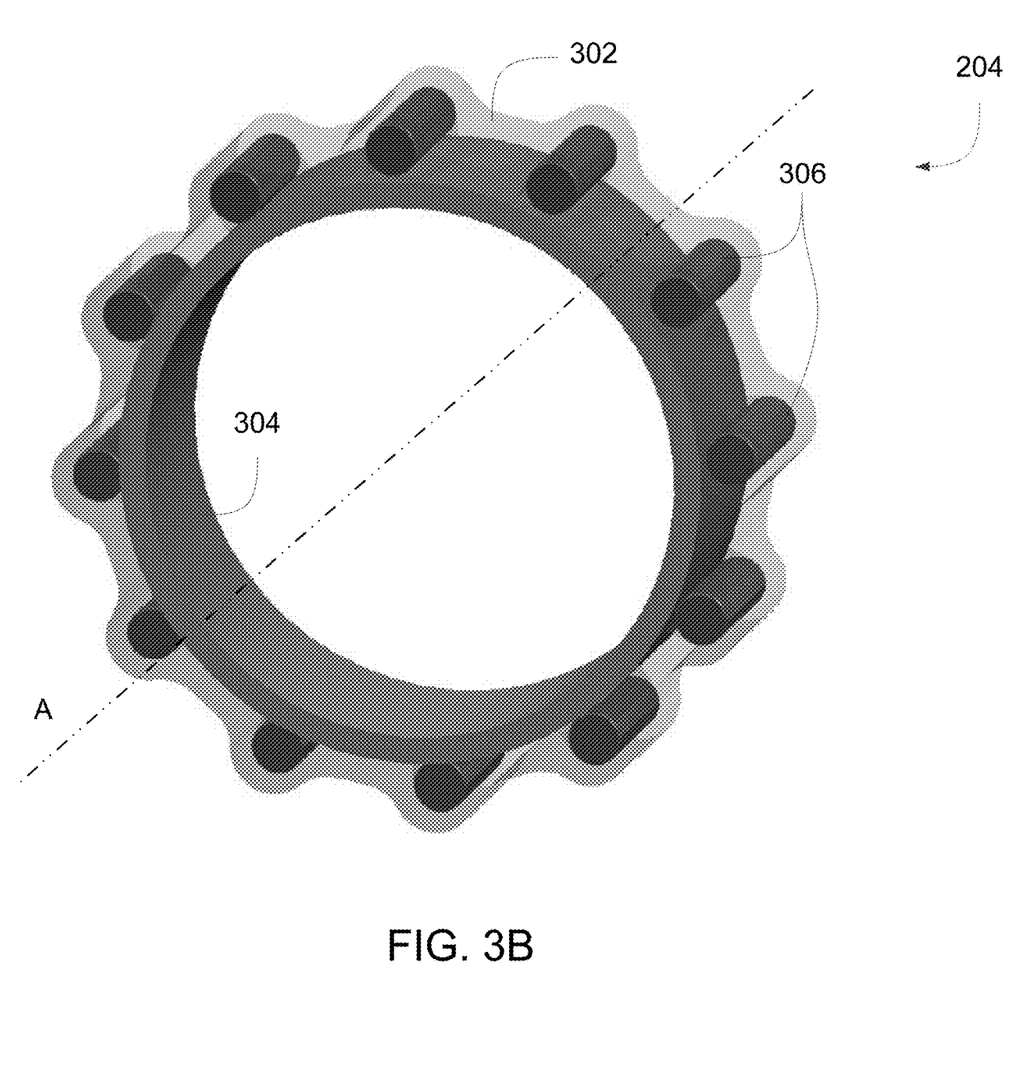
FIG. 3B is a schematic diagram showing position markers embedded in the body of the feedback device of FIG. 2, in accordance with another embodiment.

Referring now to FIG. 3A and FIG. 3B in addition to FIG. 2, the feedback device 204 illustratively comprises a body 302, a sealing member 304, and a plurality of circumferentially spaced-apart position markers 306 embedded in the body 302 and arranged along a direction (not shown) substantially parallel to the rotational axis A of the feedback device 204. As will be discussed further below, the sealing member 304 is configured to seal the body 302 via its internal diameter, and accordingly retain the position markers 306 in place within the body 302 as the feedback device 204 rotates.

The body 302 is made of a first material that exhibits non-metallic (e.g., non-ferromagnetic) properties and the plurality of position markers 306 comprise a second material that exhibits metallic (e.g., ferromagnetic) properties. In one embodiment, the sealing member 304 is also made of the first material. In another embodiment, the sealing member 304 is made of a third material that exhibits different properties than the first material. In one embodiment, the first material is a thermoplastic material (e.g., polyetheretherketone (PEEK), fiber reinforced PEEK, or Vespel™) that may allow to reduce the overall weight of the feedback device 204. The thermoplastic material may be manufactured using any suitable manufacturing process including, but not limited to, additive manufacturing (e.g., for PEEK), moulding (e.g., for fiber reinforced PEEK), and machining (e.g., for Vespel™). It should however be understood that other suitable non-ferromagnetic material including, but not limited to, ceramics, composites, and thermoplastics that can withstand the temperatures of the installation environment, may apply.

In one embodiment, the first material has a first magnetic permeability and the second material has a second magnetic permeability that is higher than the first magnetic permeability. This may allow for the strength of the signal generated by the sensor(s) 212 to be increased. In one embodiment, the second material is Mu-metal, which has relative magnetic permeability values of 80,000 to 100,000 compared to several thousand for ordinary steel. As known to those skilled in the art, materials, such as Mu-metal, provide a path for magnetic field lines around the area covered by the material. It should however be understood that materials other than Mu-metal may apply. Materials including, but not limited to, nickel, steel, ferrite ceramics, permalloy, and supermalloy, may apply.

Figure 4A:
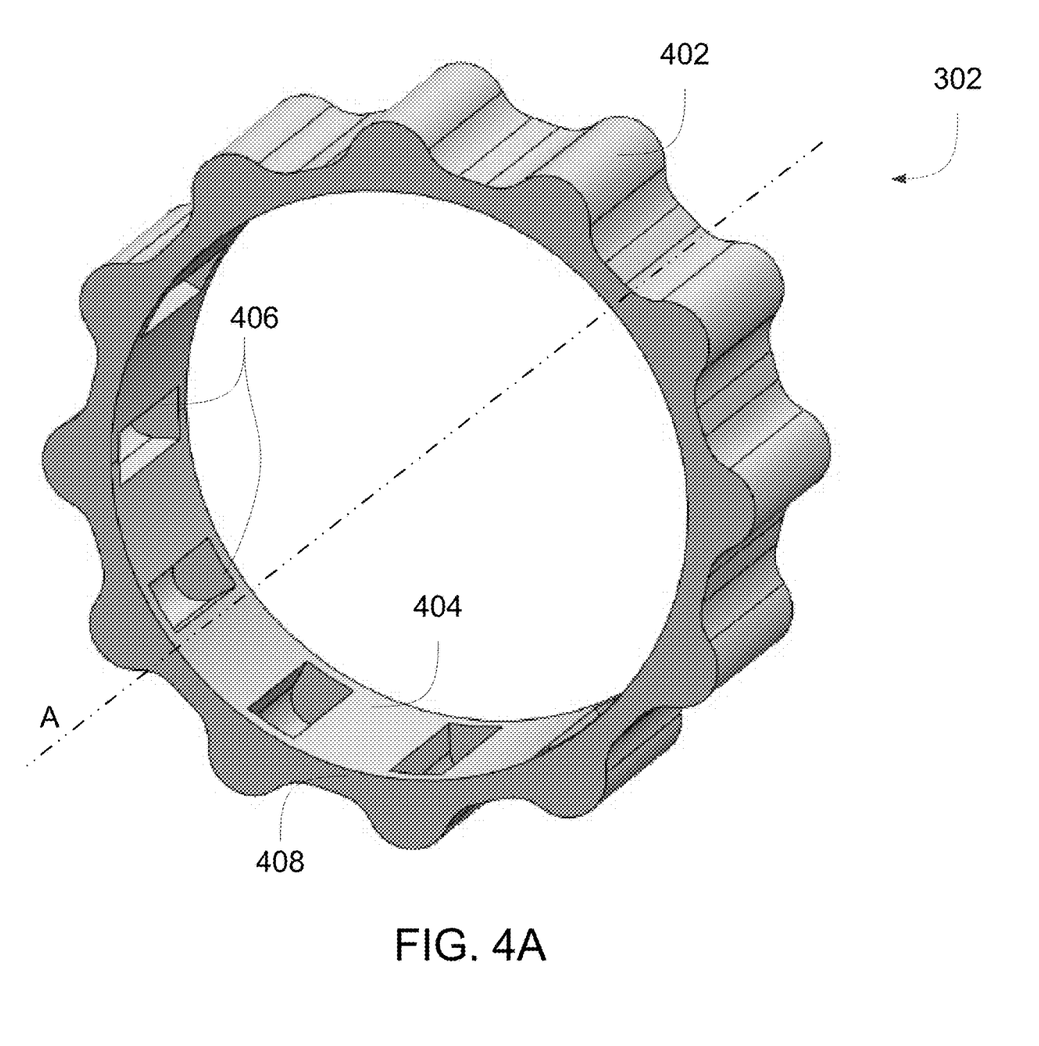
FIG. 4A is a schematic diagram of the body of the feedback device of FIG. 3A, in accordance with one embodiment.
Figure 4B:
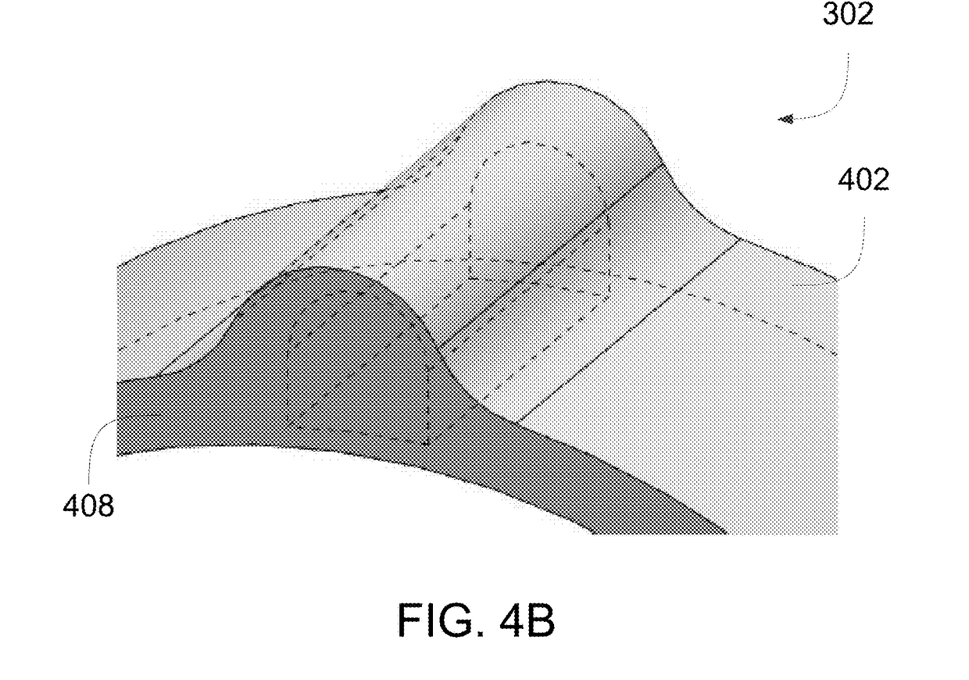
FIG. 4B and FIG. 4C are close-up views of the body of FIG. 4A, in accordance with one embodiment.
Figure 4C:
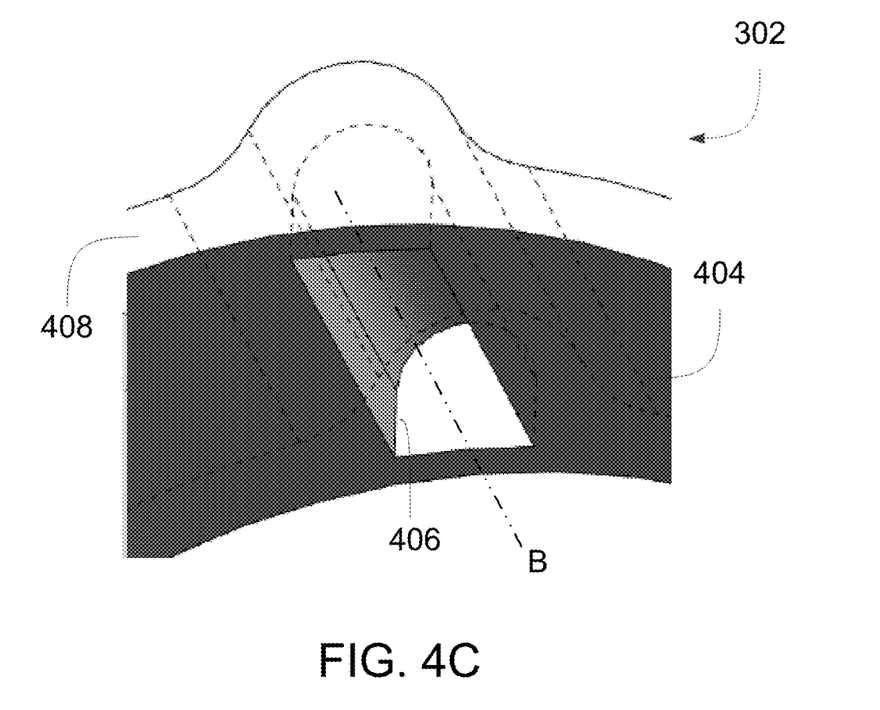

Referring now to FIG. 4A, FIG. 4B, and FIG. 4C, in one embodiment, the body 302 is an annular member having an outer surface 402 and an inner surface 404 opposite the outer surface 402. A plurality of circumferentially-spaced apart cavities 406 are formed in the body (e.g., through three-dimensional (3D) printing or machining, or the like) and extend from the inner surface 404 towards the outer surface 402. The cavities 406 are sealed from the top (i.e. by the outer surface 402 of the body 302) and sides (i.e. by side surfaces 408 of the body 302), with their opening being located on the inner surface 404. Each cavity 406 is configured to receive therein a position marker (reference 306 in FIG. 3A). In particular, the cavities 406 are shaped and sized to correspond to the shape and size of the position markers 306 such that each cavity 406 can accommodate a position marker 306 therein. The outer surface 402 of the body 302 may also be shaped accordingly, while the inner surface 404 remains substantially smooth (except for openings for the cavities 406).

In the embodiment shown in FIG. 3B, the position markers 306 are cylindrical and have a circular cross-sectional shape. The cavities 406 are shaped and sized accordingly. In particular, each cavity 406 extends axially along a direction 'B', which is substantially parallel to the rotational axis A about which the feedback device 204 rotates and substantially transverse to opposing side surfaces 408 of the body 302. Each cavity 406 also has a cross-section (e.g., half-stadium or half-obround) which matches the cross-section of the position markers 306, in order to ensure that the position markers 306 can be inserted into the cavities 406 and retained therein in their entirety (i.e. that no portion of the position markers 306 protrudes out of the cavities 406). In the embodiment of FIG. 3B, the outer surface 402 of the body 302 has an undulated outline according to the shape of the cavities 406.

It should however be understood that the position markers 306 may have any suitable size and shape. The position markers 306 may indeed have any suitable cross-sectional shape, including, but not limited to, circular, semi-circular, oval, triangular, rectangular, and square, depending on engine configuration. The outer surface 402 (and accordingly the cavities 406) may therefore have any shape that matches the shape of the position markers 306.

Figure 5:
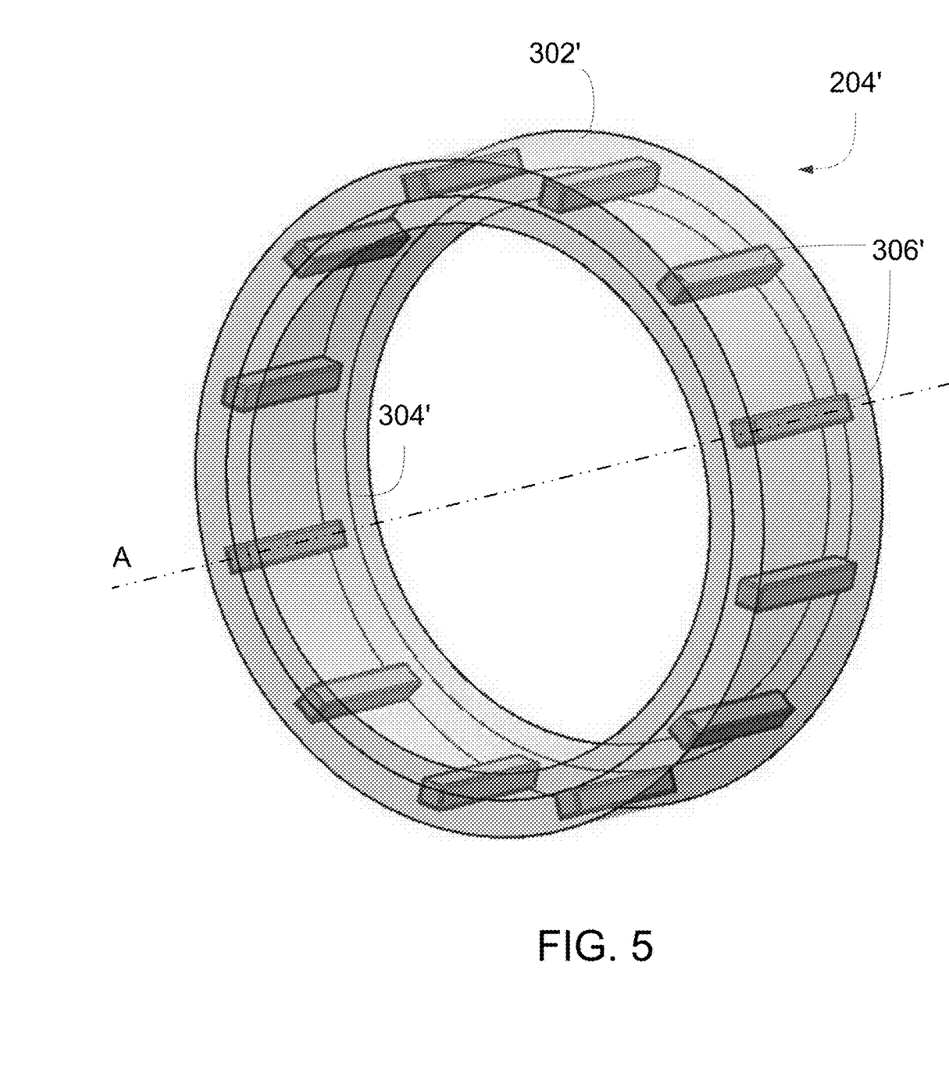
FIG. 5 is a schematic diagram showing position markers embedded in the body of a feedback device, in accordance with yet another embodiment.

In some embodiments, it may be desirable for the cross-sectional shape of the position markers 306 to be circular, semi-circular, oval, or otherwise rounded for stress purposes. However, in other embodiments, it may be desirable for the cross-sectional shape of the position markers 306 to be generally rectangular or square in order to improve signal strength and accuracy. For example, in one embodiment, the position markers 306 have a square cross-section and the outer surface 402 may comprise a rectangular pattern of extrusions. This is illustrated in FIG. 5, which shows a feedback device 204' comprising a body 302', a sealing member 304', and a plurality of circumferentially spaced-apart position markers 306' embedded in the body 302' and arranged along a direction (not shown) substantially parallel to the rotational axis A of the feedback device 204'. The position markers 306' have a square cross-section. In other words, each position marker 306' is a cuboid having rectangular faces that meet pairwise in a right angle. It should however be understood that, in other embodiments, the position marker's cross-section may be square (or rectangular) with rounded corners. Other embodiments may apply.

It should however be understood that, rather than having a patterned profile, the outer surface (reference 402 in FIG. 4A) may have a smooth profile (i.e. the feedback device 204, 204' may have a single outer diameter). Other embodiments may apply.

Figure 6A:
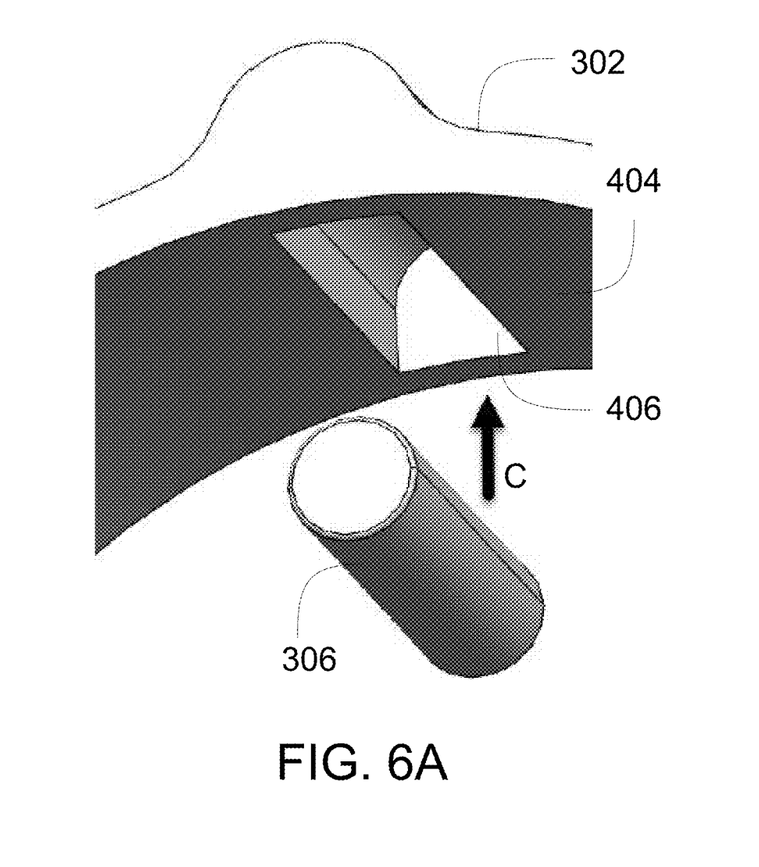
FIG. 6A is a schematic diagram of a position marker being inserted into a cavity of the body of FIG. 4A
Figure 6B:
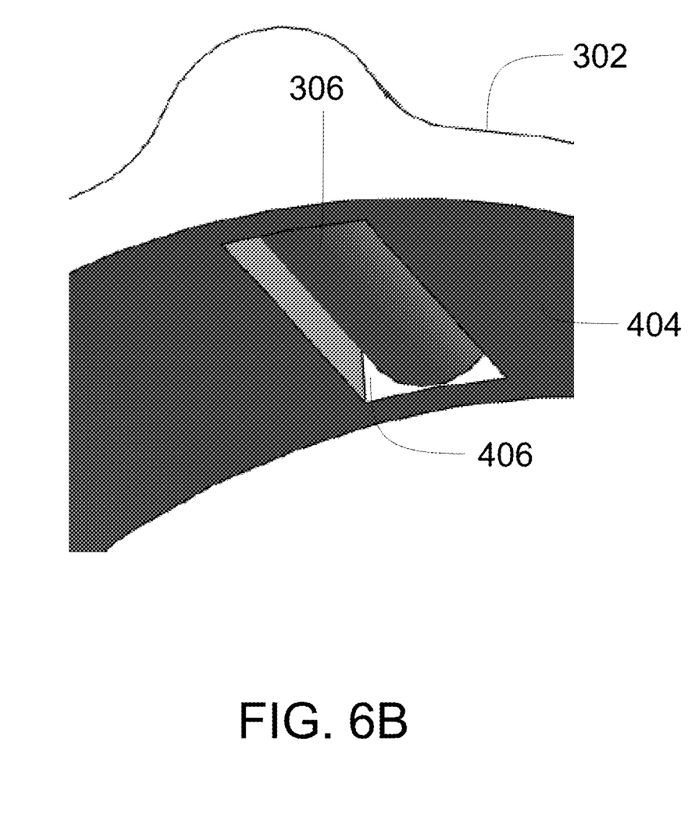
FIG. 6B is a schematic diagram showing the position marker within the cavity, in accordance with one embodiment.

Referring now to FIG. 6A and FIG. 6B, in one embodiment, each position marker 306 is inserted into a corresponding cavity 406 through the inner surface 404 of the body 302 (e.g., along the direction of arrow C of FIG. 6A). In one embodiment, the cavities 406 and the position markers 306 may be shaped and sized such that each position marker 306 fits into the corresponding cavity 406. In another embodiment, an adhesive, sealant, potting, or the like (not shown) may be provided within the cavities 406 to fill the interstitial space between the body 302 and the position markers 306 and accordingly secure the position markers 306 in place therein. However, it may be desirable for the position markers to be removable rather than permanently affixed within the cavities 406. Still, it should be understood that the accuracy of the overall feedback system 200 illustratively depends on the position of the position markers 306. It is therefore desirable to limit movement of the position markers 306 within the cavities 406.

Figure 7A:
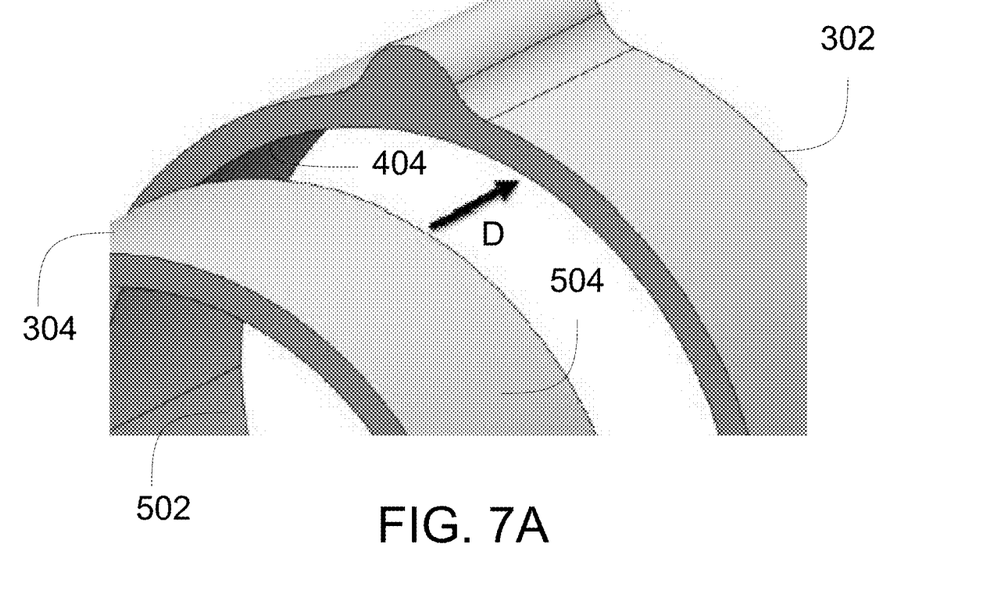
FIG. 7A is a schematic diagram of a sealing member being secured to the body of FIG. 4A
Figure 7B:
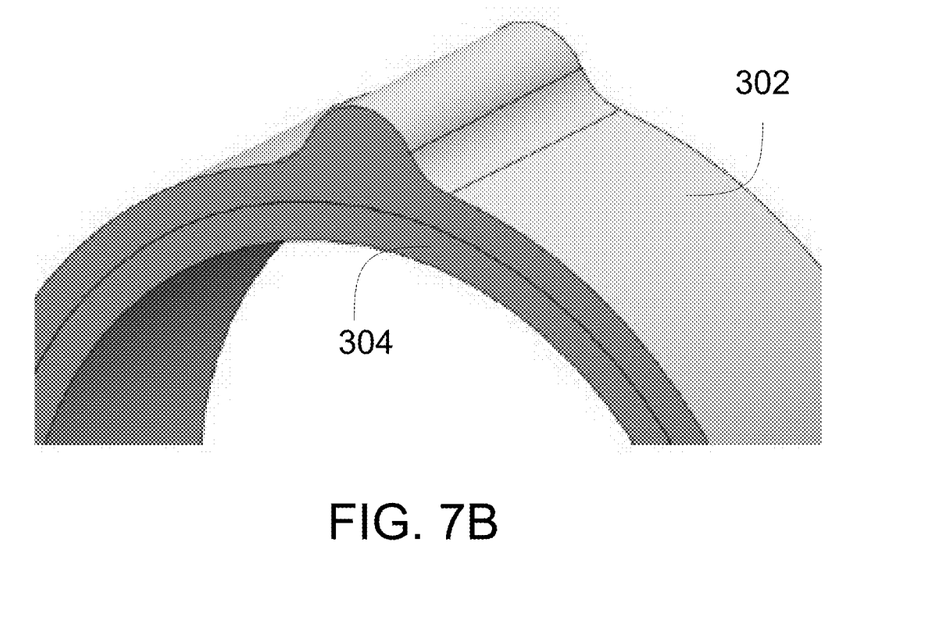
FIG. 7B is a schematic diagram showing the sealing member secured to the body, in accordance with one embodiment.

Depending on engine operating conditions, thermal effects on the feedback device 204 may indeed cause the position markers 306 to shift when the cavities 406 are open, which may in turn reduce the accuracy of the feedback system 200. Referring now to FIG. 7A and FIG. 7B, in order to prevent the position markers 306 from escaping the cavities 406, the sealing member 304 may be secured to the body 302 for retaining the position markers 306 within the cavities 406. In one embodiment, the sealing member 304 is configured as a sleeve that has an inner surface 502 and an outer surface 504. The values of the inner diameter and the outer diameter of the sealing member 304 are determined to achieve the desired coupling between the sealing member 304 and the body 302. In particular, the outer diameter of the sealing member 304 may be set such that the sealing member 304 may be inserted into the body 302 (e.g., along the direction of arrow D of FIG. 7A), with the outer surface 504 of the sealing member 304 abutting against the inner surface 404 of the body 302 (as shown in FIG. 7B). When so positioned, the sealing member 304 prevents the position markers 306 from escaping the cavities 406 through the inner surface 404 of the body 302 during operation.

Although the body 302 is described herein as being configured to receive the position markers 306 into the cavities 406 through the inner surface 404, it should be understood that, in some embodiments, the position markers 306 may be received into the cavities 406 through the outer surface (reference 402 of FIG. 4A) of the body 302. For this purpose, the cavities 406 may be configured to extend from the outer surface 402 towards the inner surface 404 and may be sealed from the bottom (i.e. by the inner surface 404) and sides (i.e. by side surfaces 408 of the body 302), with their opening being located on the outer surface 402. In this embodiment, the body 302 may then have a substantially smooth outer surface 402 and the sealing member 304 may be configured to seal the outer surface 402. For this purpose, the value of the inner diameter of the sealing member 304 may be set such that the sealing member 304 can be slid over the body 302, with the inner surface 502 of the sealing member 304 abutting against the outer surface 402 of the body 302. When so positioned, the sealing member 304 prevents the position markers 306 from escaping the cavities 406 through the outer surface 402 of the body 302 during operation.

In one embodiment, the rotating component is a shaft (e.g., the high pressure shaft, reference 24 in FIG. 1, or the low pressure shaft, reference 28 in FIG. 1) of the engine (reference 10 in FIG. 1). The sealing member 304 may be configured to be secured on the engine shaft for coupling the feedback device 204 to the rotating component. In order to retain the sealing member 304 relative to the body 302 of the feedback device 204 (e.g., avoid slipping of the sealing member 304), an interference fit or one or more locking members (e.g., equally spaced dogs, serrations, keyways, quasi-spline, and the like) may be provided on the sealing member 304 to secure the latter to the body 302. The side surfaces 408 of the body 302 may alternatively be knurled employing a tight fit to secure the sealing member 304 relative to the body 302.

Figure 8:
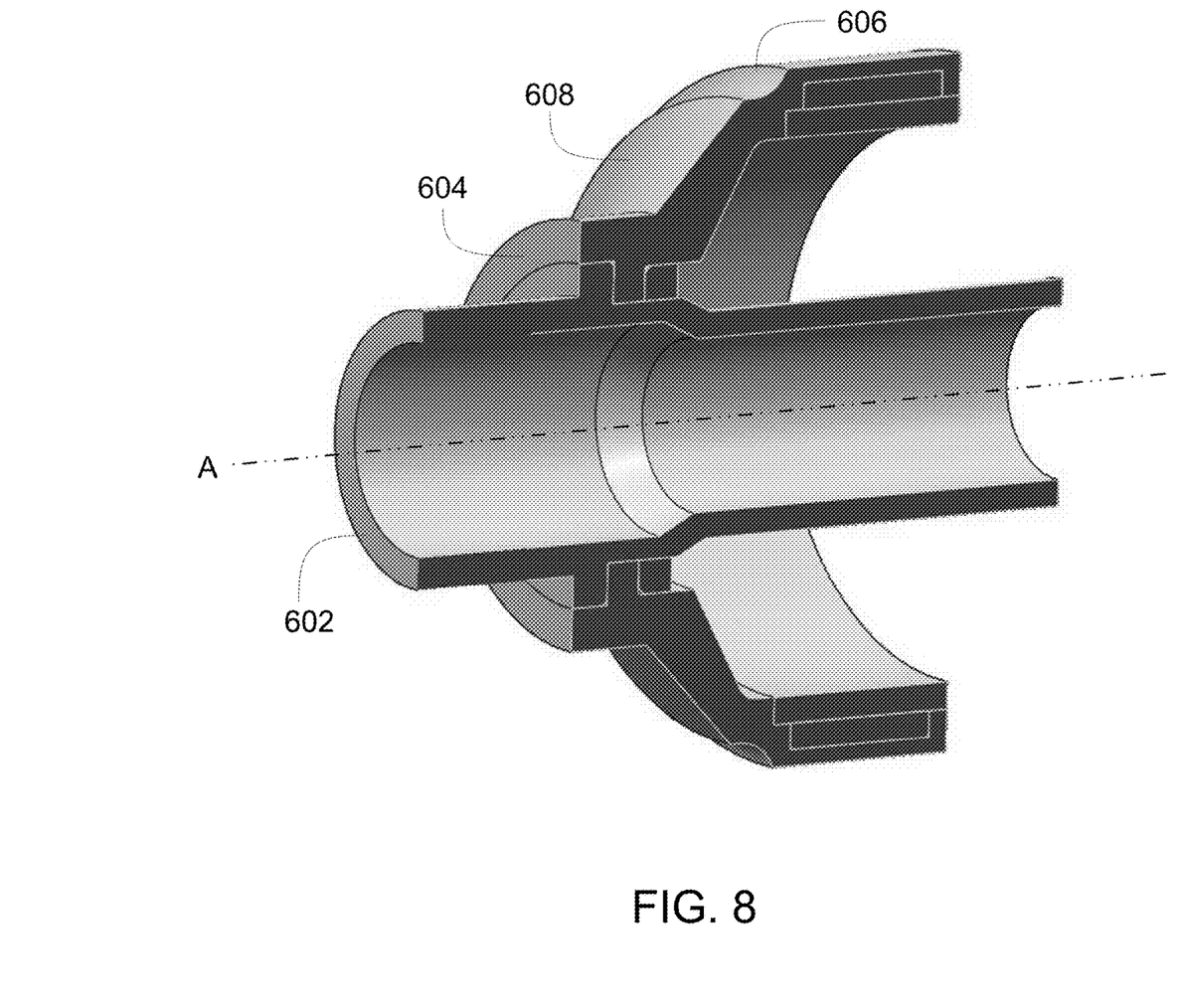
FIG. 8 is a schematic diagram of an extended portion of the body of a feedback device, in accordance with one embodiment.

In another embodiment, for clearance and space-saving considerations, the body 302 of the feedback device 204 may be extended (on one side of the engine shaft) axially along the axis A (i.e. at an angle to axis substantially equal to zero) or at a (non-zero) angle to axis A, the value of the angle depending on engine configuration. The extended portion (referred to herein as an 'extended member') of the body 302 may be attached to the engine shaft. This is illustrated in FIG. 8, which shows an engine shaft 602 to which an extended portion (or member) 604 of a feedback device body 606 is secured, using suitable attachment means (not shown). The body 606 is extended along the axis A, on one side of the engine shaft 602, to form the extended portion 604. In the illustrated embodiment, the extended portion 604 has a substantially circular cross-section whose inner diameter is smaller than the inner diameter of the cross-section of the body 606. A sloped (or slanted) portion (or member) 608 may thus be created to serve as a transition between the body 606 and the extended portion 604. The value of the inner diameter of the extended portion 604 may be set such that the engine shaft 602 can be slid into the extended portion 604, with the inner surface 502 of the extended portion 604 abutting against the outer surface (not shown) of the engine shaft 602.

In one embodiment, using a non-conductive material for the feedback device 204 described herein may allow for electrical isolation of the feedback device 204 in order to avoid a conductive path for lightening. Since the distance (also referred to as an 'air gap') between the feedback device 204 and the sensor(s) 212 is substantially small, there is possibility of arcing between the feedback device 204 and the sensor(s) 212. By using a non-conductive material, such as a thermoplastic material, for the body 302 of the feedback device 204, the risk of sensor failure may be reduced. The use of a thermoplastic material for the body 302 may also allow for weight reductions, as discussed above. In addition, the proposed feedback device 204 may improve sensor signal strength through the use of Mu-metal position markers 306, allowing the sensor winding (and accordingly the size of the sensor(s) 212) to be decreased.

Figure 9:
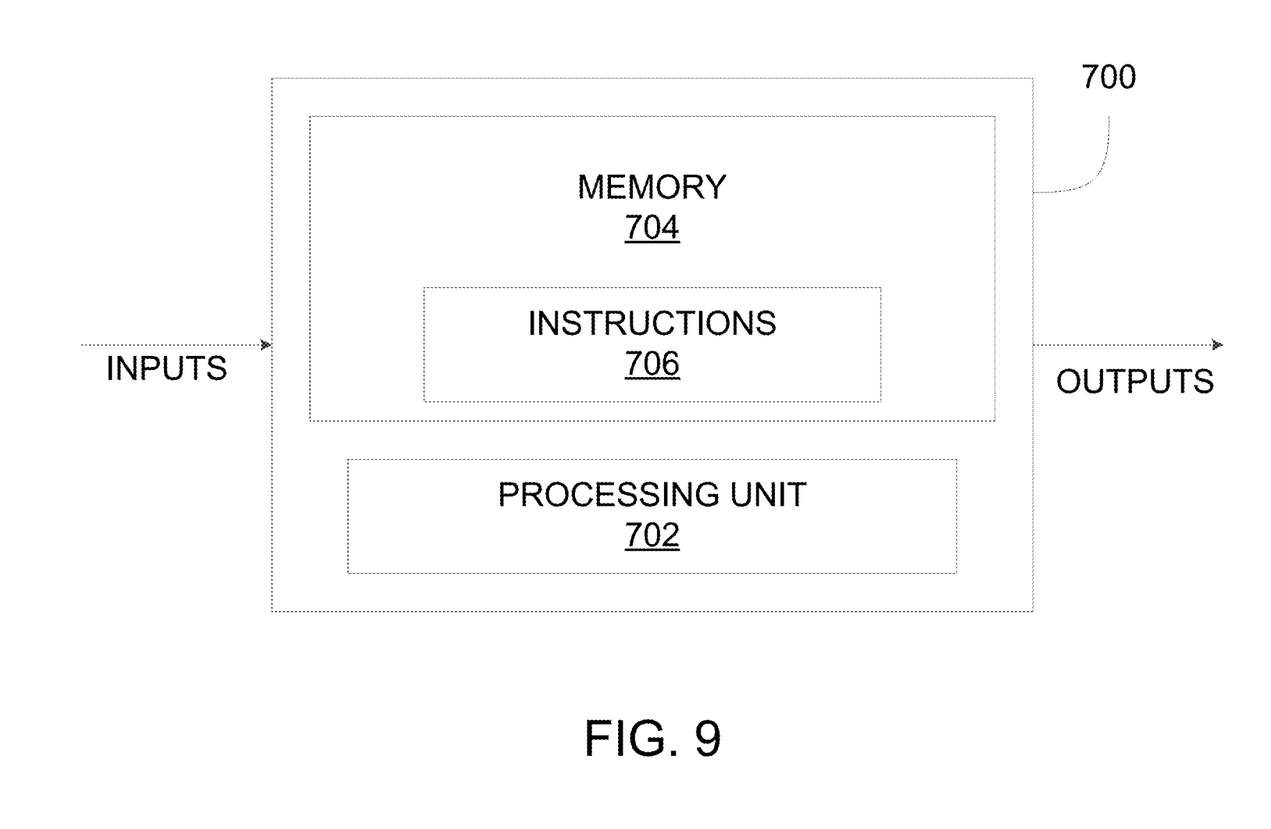
FIG. 9 is a block diagram of an example computing system for implementing the control unit of FIG. 2, in accordance with an embodiment.

FIG. 9 is an example embodiment of a computing device 700 for implementing the control unit 220 described above with reference to FIG. 2. The computing device 700 comprises a processing unit 702 and a memory 704 which has stored therein computer-executable instructions 706. The processing unit 702 may comprise any suitable devices configured to cause a series of steps to be performed such that instructions 706, when executed by the computing device 700 or other programmable apparatus, may cause the functions/acts/steps specified in the method described herein to be executed. The processing unit 702 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 704 may comprise any suitable known or other machine-readable storage medium. The memory 704 may comprise non-transitory computer readable storage medium, for example, but not limited to, an electronic, magnetic, optical, electromagnetic, infrared, or semiconductor system, apparatus, or device, or any suitable combination of the foregoing. The memory 704 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g., devices) suitable for retrievably storing machine-readable instructions 706 executable by processing unit 702.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A feedback system for a rotating component of an aircraft engine, the rotating component rotatable about an axis, the system comprising:
    a feedback device comprising:
        a body having a plurality of cavities defined therein and circumferentially spaced thereabout, each of the plurality of cavities configured to receive therein one of a plurality of position markers, the body comprising an outer surface and an inner surface opposite the outer surface, the plurality of cavities extending from the inner surface towards the outer surface and the plurality of position markers configured to be inserted into the plurality of cavities through the inner surface, the body made of a non-ferromagnetic material and the plurality of position markers comprising a ferromagnetic material, and
        a sealing member configured to be secured to the body for retaining the plurality of position markers within the plurality of cavities;
    at least one sensor configured for producing at least one sensor signal in response to detecting a relative movement between the feedback device and the at least one sensor, one of the feedback device and the at least one sensor coupled to rotate with the rotating component; and
    a processing unit communicatively coupled to the at least one sensor and configured to determine a rotational speed of the rotating component from the at least one sensor signal received from the at least one sensor.

2. The feedback device of claim 1, wherein the sealing member is configured to be secured to the inner surface of the body for retaining the plurality of position markers within the plurality of cavities.

3. The feedback system of claim 1, wherein the plurality of position markers are configured to fit into the plurality of cavities.

4. The feedback system of claim 1, further comprising an adhesive disposed within the plurality of cavities for retaining the plurality of position markers therein.

5. The feedback device of claim 1, wherein each of the plurality of position markers has one of a circular, a semi-circular, an oval, a rectangular, and a square cross-sectional shape, and further wherein each of the plurality of cavities has a corresponding cross-sectional shape.

6. The feedback system of claim 1, wherein the sealing member is made of the non-ferromagnetic material.

7. The feedback system of claim 1, wherein the non-ferromagnetic material has a first magnetic permeability and the ferromagnetic material has a second magnetic permeability greater than the first magnetic permeability.

8. The feedback system of claim 7, wherein the non-ferromagnetic material is a thermoplastic material.

9. The feedback system of claim 7, wherein the ferromagnetic material has a relative magnetic permeability between 80,000 and 100,000.

10. The feedback system of claim 1, wherein the rotating component is an engine shaft, and further wherein the sealing member is configured to be mounted on the engine shaft for coupling the feedback device to the rotating component.

11. The feedback system of claim 10, wherein the feedback device further comprises at least one locking member for securing the sealing member relative to the body.

12. The feedback system of claim 1, wherein the rotating component is an engine shaft, and further wherein the body is configured to be extended at an angle to the longitudinal axis on one side of the engine shaft to create an extended member configured to be mounted on the engine shaft for coupling the feedback device to the rotating component.

13. A feedback device for an aircraft engine, the feedback device comprising:
    a body having a plurality of cavities defined therein and circumferentially spaced thereabout, each of the plurality of cavities configured to receive therein one of a plurality of position markers, the body comprising an outer surface and an inner surface opposite the outer surface, the plurality of cavities extending from the inner surface towards the outer surface and the plurality of position markers configured to be inserted into the plurality of cavities through the inner surface, the body made of a non-ferromagnetic material and the plurality of position markers comprising a ferromagnetic material; and
    a sealing member configured to be secured to the body for retaining the plurality of position markers within the plurality of cavities.

14. The feedback device of claim 13, wherein the sealing member is configured to be secured to the inner surface of the body for retaining the plurality of position markers within the plurality of cavities.

15. The feedback device of claim 13, wherein each of the plurality of position markers has one of a circular, a semi-circular, an oval, a rectangular, and a square cross-sectional shape, and further wherein each of the plurality of cavities has a corresponding cross-sectional shape.

16. The feedback device of claim 13, wherein the sealing member is made of the non-ferromagnetic material.

17. The feedback device of claim 13, wherein the non-ferromagnetic material has a first magnetic permeability and the ferromagnetic material has a second magnetic permeability greater than the first magnetic permeability.

18. A feedback method for a rotating component of an aircraft engine, the rotating component rotatable about an axis, the method comprising, at a processing device:
    receiving at least one sensor signal from at least one sensor configured for producing the at least one sensor signal in response to detecting a relative movement between a feedback device and the at least one sensor, the feedback device comprising a body having a plurality of cavities defined therein and circumferentially spaced thereabout, each of the plurality of cavities configured to receive therein one of a plurality of position markers, the body comprising an outer surface and an inner surface opposite the outer surface, the plurality of cavities extending from the inner surface towards the outer surface and the plurality of position markers configured to be inserted into the plurality of cavities through the inner surface, the body made of a non-ferromagnetic material and the plurality of position markers comprising a ferromagnetic material, and a sealing member configured to be secured to the body for retaining the plurality of position markers within the plurality of cavities, one of the feedback device and the at least one sensor coupled to rotate with the rotating component; and
    determining a rotational speed of the rotating component from the at least one sensor signal.

* * * * *